(No Model.) 2 Sheets—Sheet 1.
W. H. KILBOURN.
ELECTRIC STOP MECHANISM.
No. 457,838. Patented Aug. 18, 1891.
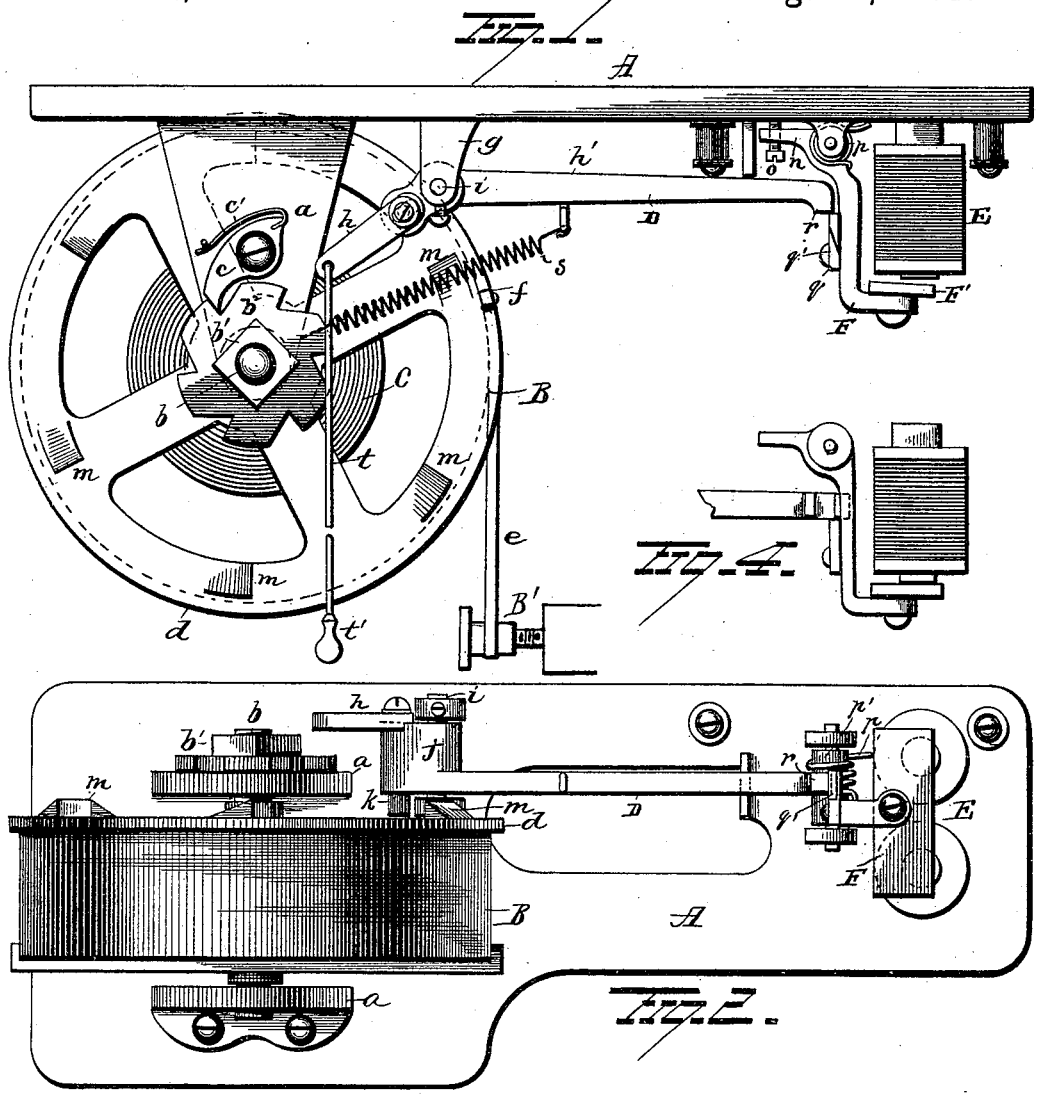

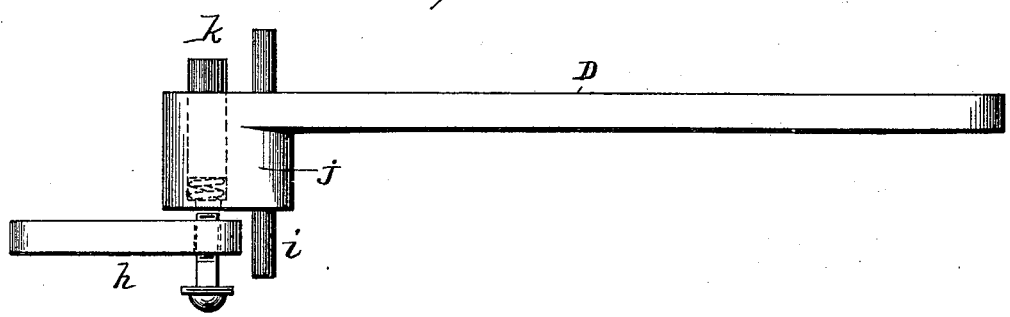

UNITED STATES PATENT OFFICE.

WASHINGTON H. KILBOURN, OF GREENFIELD, MASSACHUSETTS, ASSIGNOR TO L. J. GUNN, GEO. E. ROGERS, AND H. O. EDGERTON, ALL OF SAME PLACE.

ELECTRIC STOP MECHANISM.

SPECIFICATION forming part of Letters Patent No. 457,838, dated August 18, 1891.

Application filed December 24, 1890. Serial No. 375,661. (No model.)

*To all whom it may concern:*

Be it known that I, WASHINGTON H. KILBOURN, a citizen of Greenfield, in the county of Franklin and State of Massachusetts, have invented certain new and useful Improvements in Electric Stop Mechanisms; and I do hereby declare the following to be a full, clear, and exact description of the invention, such as will enable others skilled in the art to which it appertains to make and use the same.

My invention relates to an improvement in devices for stopping machinery, and more particularly to electro-magnetic devices for automatically closing a valve, the object of the invention being to produce electro-magnetic devices for automatically closing a valve which controls the supply of power, which devices shall be simple in construction, composed of a small number of parts, and which shall be effectual in the performance of its functions.

A further object is to produce an improved trip device which shall be effectual, sure, and sensitive in its operation.

A further object is to produce an improved adjustable tripping device for stop mechanism.

With these objects in view the invention consists in a tripping-lever for stop mechanisms, said tripping-lever carrying a yielding detent at one side of its fulcrum.

The invention further consists in a tripping-lever for a stop mechanism, said tripping-leing having a yielding detent adjustably connected thereto at one side of its fulcrum.

The invention also consists in certain novel features of construction and combinations and arrangements of parts, as hereinafter set forth, and pointed out in the claims.

In the accompanying drawings, Figure 1 is an elevation of my improvements. Fig. 2 is a plan view of the same. Fig. 3 is a detached view of the tripping-lever. Fig. 4 is a view illustrating a modification of the forward end of the tripping-lever to adapt the device to be operated on a normally-closed circuit.

A represents a suitable support, to which suitable brackets or hangers $a\,a$ are secured, and in said brackets or hangers a shaft $b$ is loosely journaled. Secured to one end of the shaft $b$ is a ratchet-wheel, on the outer face of which a nut $b'$ is made integral, whereby the shaft $b$ may be turned by means of a suitable wrench, for a purpose hereinafter set forth, and pivotally attached to one of the brackets $a$, in proximity to the ratchet-wheel $b'$, is a dog $c$, maintained in contact with the periphery of said ratchet-wheel by a spring $c'$, and thus prevents rotation of the shaft $b$ in one direction. Mounted loosely on the shaft $b$ is a drum B, having a flange $d$, on which drum a cord or wire $e$ is wound, the end of said cord or wire being inserted in a notch $f$ in the flange $d$. Located within the drum B is a coiled spring C, one end of which is secured to the drum B, and the other end being secured to the shaft $b$. Projecting from the support A are small brackets or hangers $g$, between which a trip-lever D is pivoted. The short arm $h$ of the lever D is preferably bent at an obtuse angle to the long arm $h'$ of said lever. At a point in proximity to the fulcrum $i$ of the lever D said lever is provided with a hollow boss or enlargement $j$, in which a detent $k$ is located, and adapted to project laterally from said lever D. A spring $l$ is located in the boss or enlargement $j$ behind the detent $k$, which latter is adapted to be engaged by a series of lugs $m$ on the drum B when said drum is rotated in one direction. The lugs $m$ are made with an inclined or beveled face, whereby when the drum is rotated in the opposite direction they will force the detent back against the face of the spring $l$, and thus permit the lugs $m$ to pass said detent. The detent $k$ will be made adjustable to and from the fulcrum of the lever D, for a purpose explained farther on.

Secured to the support A, in proximity to the end thereof opposite the arm B, is an electro-magnet E, and pivotally connected to the support A, in proximity to said magnet, is an armature-lever F, carrying an armature F' to be attracted by the magnet E. The armature-lever F is provided with an arm $n$, through which a set-screw $o$ is passed and adapted to engage the supporting-plate A, and thus limit the movement of the armature-lever. A spring $p$ is coiled about the trunnion $p'$ of the armature-lever, bearing at one end against said lever and at the other end against the plate or support A, and thus maintain the armature F' normally at the farthest extent of its throw from the magnet E.

Secured to the depending portion of the lever F is an arm or catch $q$, upon which a toe $r$ at the free end of the lever D is adapted to normally rest, said arm $q$ being made with a beveled portion $q'$, whereby said lever D may be permitted to force the lever F out of its path on its return movement and thus regain its normal position. The long arm $h'$ of the lever D is connected to one of the hangers $a$ by a spring $s$, whereby the trip-lever D will be prevented from returning to its normal position until positively moved to such normal position. The cord or wire $e$ on the drum B is passed around a drum B', secured to the stem of a throttle-valve, the bulk of said cord or wire being coiled about said drum B' when the valve is opened.

Connected to the free end of the short arm $h$ of the lever D is a wire or cord $t$, which projects downwardly, and at its lower end is provided with a ball or knob $t'$ within easy reach of an operator. By this means the trip-lever D may be returned to its normal position. The magnet E is connected in electric circuit with a circuit-closer of any preferred construction.

The device being thus constructed with the parts in their normal positions and the throttle-valve open, as shown in Fig. 1, and it is desired to stop the machinery, it is simply necessary to close the electric circuit, whereupon the armature F' will be attracted by the magnet E and the arm or catch $q$ will be moved out of the path of the lever D, permitting the long arm of said lever to drop and causing the short arm of said lever to be elevated. Thus the detent $k$ will be carried out of the path of the lugs $m$ on the drum B and permit said drum to rotate, being impelled by the spring C. During the rotation of the drum B, the cord or wire $e$ will be wound thereon and be unwound from the drum B' on the stem of the throttle-valve, thus turning said stem and closing the valve. The cord or wire $t$ may then be manipulated to return the lever D to its normal position. When the drum B' on the stem of the throttle-valve is rotated by the operator to open the valve, the wire or cord $e$ will be wound thereon and the drum B rotated and the spring C wound ready to again operate, as above explained, when released. By providing the ratchet-wheel $b^2$ and dog or pawl $c$ and nut $b'$ the spring may be wound by the use of a wrench without rotating the drum B, thus permitting the application of the device to a mill or other place where the device is to be used without the necessity of stopping the machinery. By arranging the detent near the fulcrum of the lever the free end of the long arm of lever D may be made to bear on the arm or catch $q$ of armature-lever F with a light pressure, notwithstanding the power or force of the spring C, so that there will be no liability of the lever D not being released when the armature-lever F is actuated; and, further, it will require but small battery power to operate the device. It is evident that the device may be operated on a normally-open circuit instead of a normally-closed circuit by simply making a slight alteration of the free end of the long arm $h'$ of the lever D, as shown in Fig. 4.

It is evident that slight changes might be made in the details of construction of my invention without departing from the spirit thereof or limiting its scope. Hence I do not wish to limit myself to the precise details of construction herein set forth; but, Having fully described my invention, what I claim as new, and desire to secure by Letters Patent, is—

1. In a stop mechanism, the combination, with a drum, of a tripping-lever, a yielding detent carried by said tripping-lever and adapted to be engaged by lugs on the drum, and electro-magnetic devices for controlling the tripping-lever, substantially as set forth.

2. The combination, with a valve-stem and a drum thereon, of a spring-actuated drum, a cord or wire passing over said drums, a tripping-lever, a detent carried by said lever adapted to be engaged by lugs on the spring-actuated drum, and electro-magnetic devices for controlling the tripping-lever, substantially as set forth.

3. The combination, with a valve-stem and a drum thereon, of a spring-actuated drum, a cord or wire passing over said drums, a tripping-lever, a detent carried by said tripping-lever and adapted to be engaged by lugs on the spring-actuated drum, an electro-magnet, an armature-lever, an armature carried by said armature-lever, and a catch carried by said armature-lever and adapted to be engaged by the tripping-lever, substantially as set forth.

4. In a stop mechanism, the combination, with suitable supports or brackets, of a shaft loosely mounted therein, a ratchet-wheel carried by said shaft, a dog to engage said ratchet-wheel, a nut adapted to rotate with the ratchet-wheel, a drum loosely mounted on said loosely-mounted shaft, and mechanism for rotating said drum and controlling its rotation, substantially as set forth.

In testimony whereof I have signed this specification in the presence of two subscribing witnesses.

WASHINGTON H. KILBOURN.

Witnesses:
C. H. KEITH,
W. B. KEITH.